(12) United States Patent
Abe et al.

(10) Patent No.: US 7,451,323 B2
(45) Date of Patent: Nov. 11, 2008

(54) PASSWORD INPUTTING APPARATUS, METHOD OF INPUTTING PASSWORD, AND COMPUTER PRODUCT

(75) Inventors: Masao Abe, Tokyo (JP); Daiji Yamano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 551 days.

(21) Appl. No.: 10/901,033

(22) Filed: Jul. 29, 2004

(65) Prior Publication Data

US 2005/0010785 A1    Jan. 13, 2005

Related U.S. Application Data

(63) Continuation of application No. PCT/JP02/02618, filed on Mar. 19, 2002.

(51) Int. Cl.
*H04L 9/00* (2006.01)

(52) U.S. Cl. ...................... 713/183; 713/184
(58) Field of Classification Search ............... 713/183, 713/184
See application file for complete search history.

(56) References Cited

U.S. PATENT DOCUMENTS

| 5,559,961 | A | * | 9/1996 | Blonder ................. 726/18 |
| 5,664,099 | A | * | 9/1997 | Ozzie et al. ............. 726/29 |
| 2004/0030934 | A1 | * | 2/2004 | Mizoguchi et al. ......... 713/202 |

FOREIGN PATENT DOCUMENTS

| EP | 0947908 A2 | 10/1999 |
| JP | 63-245758 | 10/1988 |
| JP | 6-318186 | 11/1994 |
| JP | 07-254955 | 10/1995 |
| JP | 7-295673 | 11/1995 |
| JP | 9-212716 | 8/1997 |
| JP | 11-126191 | 5/1999 |
| JP | 11-345206 | 12/1999 |
| JP | 2000-099801 | 4/2000 |
| JP | 2000-172644 | 6/2000 |
| JP | 2000-293296 | 10/2000 |
| WO | WO99/21073 | 4/1999 |

OTHER PUBLICATIONS

Ueda et al., "Observation-Resistant Human Identification Scheme with Visual Pattern", The Institute of Electronics, Information and Communication, 1993, p. 1-258.

* cited by examiner

*Primary Examiner*—Gilberto Barron, Jr.
*Assistant Examiner*—Devin Almeida
(74) *Attorney, Agent, or Firm*—Staas & Halsey LLP

(57) ABSTRACT

An image display controlling unit controls to display a standard image and a dummy image. The standard image is an image that has been previously decided by the user. The dummy image looks like the standard image but the standard image and the dummy image has differences that only the user can identify and that can not be identified from a distance. The user selects a predetermined section of the standard image and selects a dummy section from the dummy image. A password is input based on information corresponding to the predetermined section of the standard image and information corresponding to the dummy section of the dummy image is neglected.

13 Claims, 9 Drawing Sheets

FIRST DISPLAY IMAGE
(IMAGE NO.: 12)

SECOND DISPLAY IMAGE
(IMAGE NO.: 1)

THIRD DISPLAY IMAGE
(IMAGE NO.: 5)

FOURTH DISPLAY IMAGE
(IMAGE NO.: 2)

FIG.3

PASSWORD DB
14b

| USER NO. | PASSWORD |
|---|---|
| 0001 | (12,2,6) → (2,4,5) → (7,5,9) → (4,5,6) |
| 0002 | (1,4,5) → (11,5,6) → (6,6,5) → (8,5,8) |
| ⋮ | ⋮ |

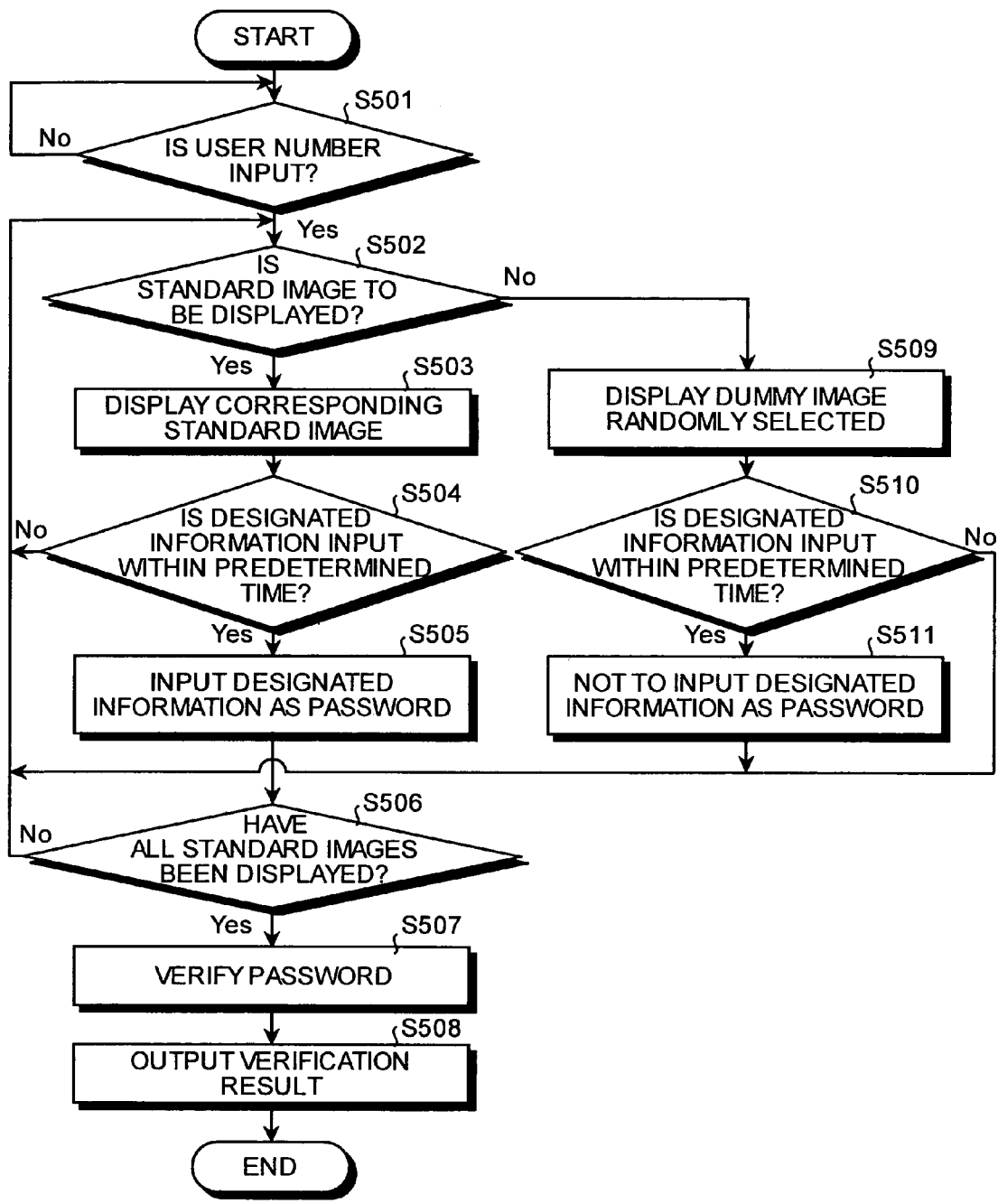

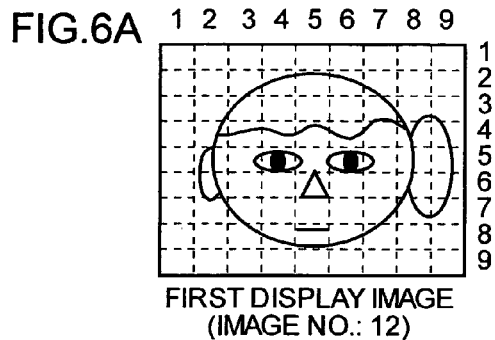
FIG.6A FIRST DISPLAY IMAGE (IMAGE NO.: 12)
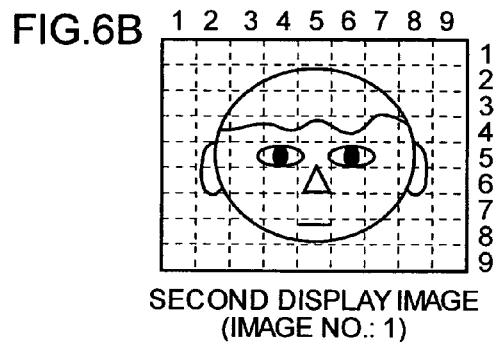
FIG.6B SECOND DISPLAY IMAGE (IMAGE NO.: 1)
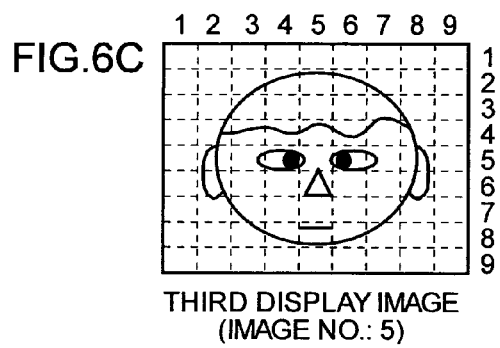
FIG.6C THIRD DISPLAY IMAGE (IMAGE NO.: 5)
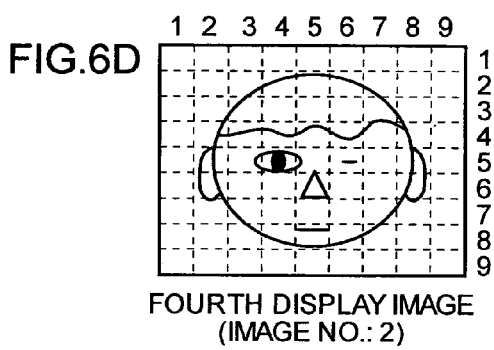
FIG.6D FOURTH DISPLAY IMAGE (IMAGE NO.: 2)
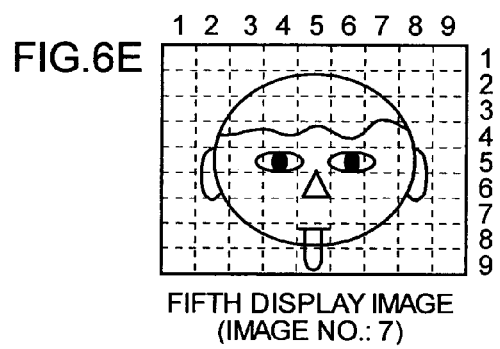
FIG.6E FIFTH DISPLAY IMAGE (IMAGE NO.: 7)
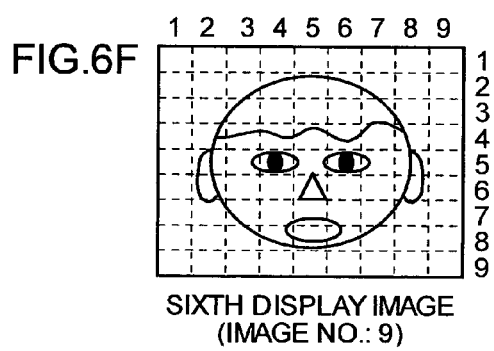
FIG.6F SIXTH DISPLAY IMAGE (IMAGE NO.: 9)
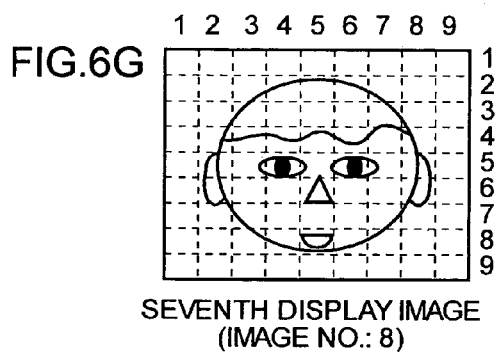
FIG.6G SEVENTH DISPLAY IMAGE (IMAGE NO.: 8)
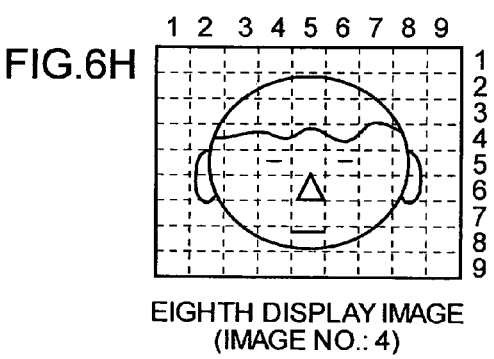
FIG.6H EIGHTH DISPLAY IMAGE (IMAGE NO.: 4)

PASSWORD INPUTTING APPARATUS, METHOD OF INPUTTING PASSWORD, AND COMPUTER PRODUCT

This application is a continuing application, filed under 35 U.S.C. §111(a), of International Application PCT/JP02/02618, filed Mar. 19, 2002.

TITLE OF THE INVENTION

Password inputting apparatus, method of inputting password, and computer product

TECHNICAL FIELD

The present invention relates to a technology for generating a password by using a plurality of images and inputting the password.

BACKGROUND ART

ATMs (automatic teller machine) in banks and the like, or some information devices such as personal computers require a user to input a unique password. In the most common method for inputting the password, the user is asked to select or input numerals and/or characters.

Recently, a new method has been proposed. In this method the user is asked to select a certain area in an image displayed for him, and then, the information relating to that area is input as the password. This technique is explained in detail below with the help of FIG. 9. In this method, an image is displayed for the user and they are asked to select desired areas (rectangles) in the image. Information corresponding to the areas selected by the user is input as passwords. For example, if a user sequentially selects "right eye→left ear→mouth→nose" in the display image in the diagram, coordinates of these areas, i.e., "(4, 5)→(8, 5)→(5, 8)→(5, 6)", are input as the password.

In another conventional method, many images are displayed one by one and the user is asked to select a desired area in each image. For example, the image shown in FIG. 9 is displayed one by one, and information corresponding to the area selected by the user in each image is input as the password.

These conventional methods make it easy for the user to remember the password because the user needs to simply visually remember areas of the image corresponding to his/her password.

However, the conventional methods have a problem that the password can be easily stolen by a third party, by just watching the operations performed by the user. In other words, although there is a merit that it is easy for the user to remember the password, there is a demerit that it is also easy for the third party to remember the password.

One approach to solve this problem is to increase the area in an image, or to increase the number of the images. However, there is a drawback that this increases the amount of information that the user is required to remember.

Thus, the issues those need to be solved are: how to make the password easy for the user to remember and how to make the password difficult for the third party to remember.

DISCLOSURE OF THE INVENTION

It is an object of the present invention to at least solve the problem in the conventional technology.

A password inputting apparatus according to an aspect of the present invention includes a displaying unit that displays a standard image that has been previously chosen by the user as an image for password input, and displays at least one dummy image that substantially looks like the standard image; a selecting unit with which a user selects a predetermined first section in the standard image, and with which a user selects a second section in the dummy image; a password generating unit that generates a password based on information corresponding to the first section and does not generate a password based on information corresponding to the second section; and a password inputting unit that inputs the password as a password for a password verification of the user.

A method of inputting a password according to another aspect of the present invention includes displaying a standard image that has been previously chosen by the user as an image for password input; displaying at least one dummy image that substantially looks like the standard image; making the user select a predetermined first section in the standard image; making the user select a second section in the dummy image; generating a password based on information corresponding to the first section and not generating a password based on information corresponding to the second section; and inputting the password as a password for a password verification of the user.

A computer program according to still another aspect of the present invention realizes the above method according to the present invention on a computer.

A computer-readable recording medium according to still another aspect of the present invention stores the above computer program according to the present invention on a computer.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 3 is a table that illustrates an example of a structure of information that is stored in a password DB shown in FIG. 1;

FIG. 5 is a flowchart for explaining a password inputting process by the password inputting apparatus;

FIGS. 6A to 6H are diagrams for explaining an image that is displayed on a touch panel unit shown in FIG. 1;

BEST MODE FOR CARRYING OUT THE INVENTION

Exemplary embodiments of a password inputting apparatus, a method of inputting a password, and a computer product according to the present invention are explained below in detail with reference to accompanying drawings.

In a first embodiment, the password inputting apparatus and the method of password input according to the present invention are explained. In this embodiment, an overview and main feature of the password inputting apparatus according to the first embodiment of the present invention are explained, then, a structure of each part in the password inputting apparatus is explained, and finally, a procedure of a password inputting process by the password inputting apparatus is explained.

Figure 1:
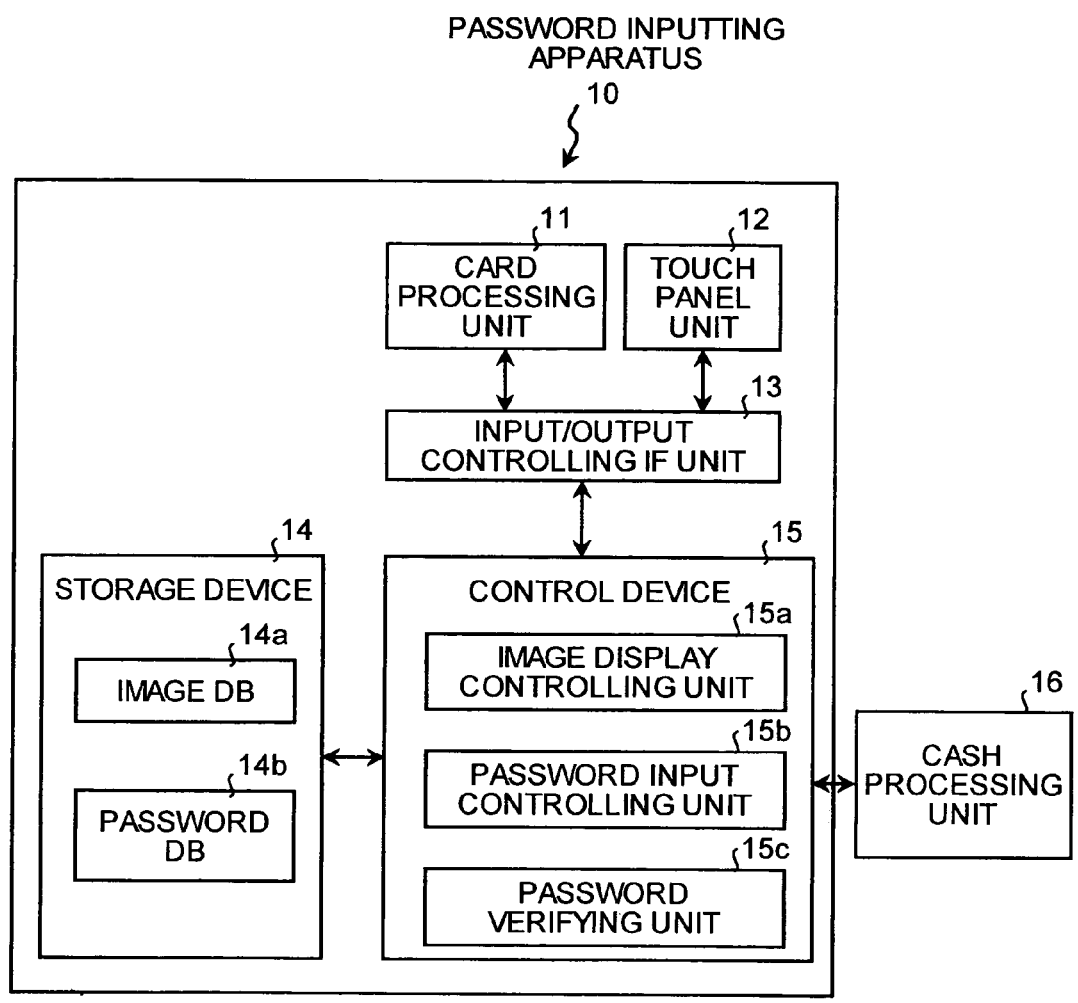
FIG. 1 is a block diagram of a password inputting apparatus according to a first embodiment of the present invention.

First, the overview and the main feature of the password inputting apparatus according to the first embodiment of the present invention are explained. FIG. 1 is a block diagram of a password inputting apparatus 10 according to the first embodiment of the present invention. The password inputting apparatus 10 is applied, for example, to an ATM (automatic teller machine) in a financial institute, and as shown in the figure, it is configured together with a cash processing unit 16 that accepts and/or dispatches cash.

Roughly, the password inputting apparatus 10 requires a person (hereinafter, "user") subject to password verification to sequentially designate a predetermined section in a plurality of display images, and designated information to the display image is input as a password for verification. The password inputting apparatus 10 verifies the password that is input, and outputs a verification result to the cash processing unit 16. The cash processing unit 16 executes accepting and/or dispatching of the cash only when the verification of the password input succeeds.

The main feature of the password inputting apparatus is its ability to prevent the password being stolen by a third party even if the password input is seen by the third party. The main feature is specifically explained below.

The password inputting apparatus 10 displays a standard image chosen in advance by a user as images for inputting the password, and dummy images made to look like the standard image, and inputs only designated information for the standard image as the password for the verification, while the password inputting apparatus does not input designated information for the dummy images as the password for the verification.

In other words, in the method of inputting the password according to the conventional technology, the image displayed for the user is always the image for the password input. On the other hand, the password inputting apparatus 10 according to the first embodiment displays, for the user, not only the images for the password input (the standard images) but also the dummy images, which are made to look like the standard images, and for which the designated information is controlled not to be input as the password for the verification.

Therefore, if the standard image is displayed, the user, who inputs the password, designates a section that corresponds to the password sequentially. On the other hand, if the dummy image, which is not the standard image, is displayed, the user randomly designates a section he/she likes because the designated information for the dummy image is not to be input as the password for verification.

Thus, in the password inputting apparatus 10 according to the first embodiment, even if the user is required to make designation in many images including the dummy images, information that is input as the password does not increase because the designated information for the dummy images is not input as the password for the verification. Therefore, it is easy for the user to input a proper password (a password that leads to a successful result in the verification) because the user has to simply remember information such as "which section in the standard images that are displayed sequentially should be selected".

On the other hand, it is impossible for the third party, who sees the password input operated by the user, to recognize the image displayed is whether the standard image or the dummy image. Therefore, to input the proper password, the third party has to remember all the sections that are designated by the user. However, it is difficult to remember all the sections that are designated by the user because the user not only makes input operation to the standard images, but also makes dummy random input operation to the dummy images.

Therefore, according to the password inputting apparatus 10 of the first embodiment, the main feature makes it possible to prevent the password from being guessed by the third party even if the password input is seen by the third party.

A structure of each part in the password inputting apparatus 10 is explained next. As shown in FIG. 1, the password inputting apparatus 10 includes a card processing unit 11, a touch panel unit 12, an input/output controlling IF unit 13, a storage device 14, and a controlling device 15.

The card processing unit 11 is for processing a card (card that is issued to the user by a financial institute) that is inserted by the user. Specifically, the card processing unit 11 reads a user number (an identification number to uniquely identify each of the users) and the like, and inputs to the password inputting apparatus 10.

The touch panel unit 12 is for accepting the input of various kinds of information by the user to the password inputting apparatus 10, and for displaying various kinds of information to the user. Specifically, the touch panel unit 12 displays the standard image and the dummy image for the user, and inputs the designated information for the standard images and the dummy images to the password inputting apparatus 10.

Figure 9:
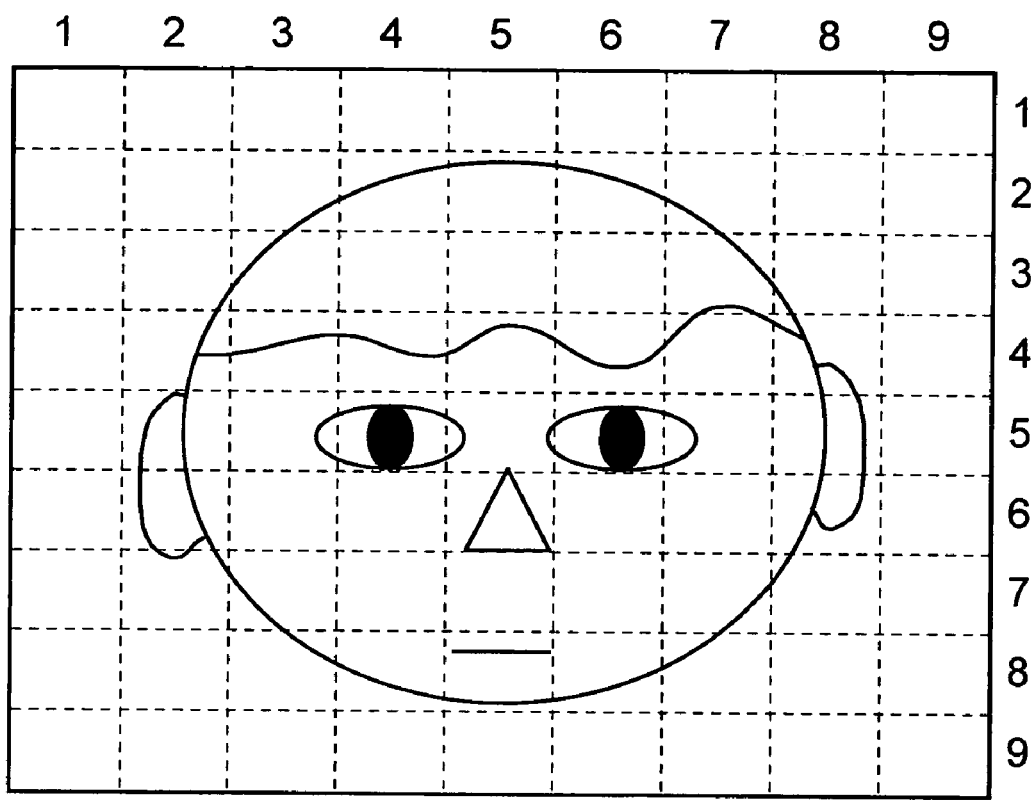
FIG. 9 is a diagram for explaining a method of inputting a password according to a conventional technology.

The designated information is information that indicates a rectangle area that the user designates (touches) in the display image. For example, if the user touches the "right eye" in the display image shown in FIG. 9, (4, 5) is input as the designated information. Thus, the information that indicates the predetermined rectangle area according to the designation made for the predetermined rectangle area in the display image is input for the purpose of making it easy for the user to carry out the designation operation. In other words, the user can carry out the designation operation smoothly because the same designated information can be input regardless of which part in the predetermined rectangle area is pointed, as long as within the same rectangle area.

Referring to FIG. 1 again, the input/output controlling IF unit 13 controls input and output of data by the card processing unit 11 and the touch panel unit 12. The storage device 14 is a storing unit (storage unit) to store data and a computer program that is necessary for various processes carried out by the control device 15, and includes an image DB 14a and a password DB 14b as conceptual functions.

Figure 2:
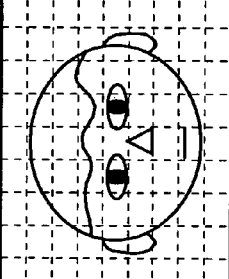
FIG. 2 is a diagram that illustrates an example of a structure of information that is stored in an image DB shown in FIG. 1.

The image DB 14a is a database that stores the images to be displayed in the touch panel unit 12. Specifically, the information stored in the image DB 14a includes data of each of the images to be displayed in the touch panel unit 12, and of image numbers to uniquely identify each of the images, that correspond to each other as shown in FIG. 2. Each of the images can be the standard image for some users, and the dummy image for other users.

Characteristics of each of the images stored in the image DB 14a are explained. As shown in FIG. 2, each of the images store in the image DB 14a includes the same components such as "an outline, a hair, an eye, a nose, a mouth, and an ear", and is recognized as the same concept of a "human face". Therefore, variations are made by giving simple image processing to one image (for example, the image of which the image number is "1").

As shown in FIG. 2, the variations include closing an eye (variations of a right eye, left eye, both eyes, and the like), opening an eye (variations of right eye, a left eye, both eyes, and various sizes of an eye opened), crossing eyes (variations of a right eye, a left eye, both eyes, and various positions of eyes crossed), opening a mouth (variations of opening the mouth within one mesh, and widely opening the mouth using more than one mesh), putting a tongue out of the mouth, making a nose running (variations of a right nose hole, a left nose hole, and both nose holes), making an ear big (variations of a right ear, a left ear, and both ears) and the like.

Thus, a plurality of the images that are composed of the same components, and that can be recognized as the same concept are stored in the image DB 14a for the purpose of assuring the prevention of the password being guessed by the third party even if the password input is seen by the third party. In other words, compared to when a plurality of images that include different components, and that are recognized as each different concept are displayed in the touch panel 12, a plurality of similar images in which the user operates the input are considered to be more difficult for the third party to memorize the input operation made in the similar images.

To explain the storage device 14 again, the password DB 14b is a database to store a password that is set in advance by each of the users that owns the card. Specifically, information stored in the password DB 14b includes a user number (identification number to uniquely identify each of the users) of each of the user that is included in the card, and the password, which is set in advance by each of the users, that correspond to each other.

As shown in FIG. 3, the password stored in the password DB 14b includes a plurality of information such as (12, 2, 6) in a row. The information is composed of a combination of the image number (that corresponds to "12" among (12, 2, 6) above) that corresponds to the image that is chosen in advance by each of the users as the standard image (the image for the password input), and the information (that corresponds to "2, 6" among (12, 2, 6) above) that indicates the predetermined rectangle area that are chosen in advance by the user in the standard image.

A registration process of the password that is stored in the password DB 14b is specifically explained. FIG. 4 is a diagram for explaining the information that is stored in the password DB 14b shown in FIG. 3. The registration process of the password is explained supposing the user given a user number "0001" has carried out the registration process of the password shown in FIG. 4 in advance.

It is supposed that the user of the user number "0001" has chosen the images of which the image numbers are each "12, 7, 4" as the standard images among the plurality of the images stored in the image DB 14a as shown in FIG. 4.

Figure 4A:
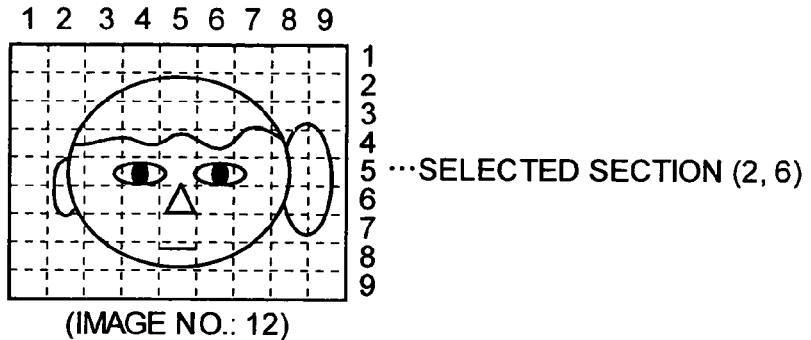
FIGS. 4A to 4D are diagrams for explaining the information that is stored in the password DB shown in FIG. 3.
Figure 4B:
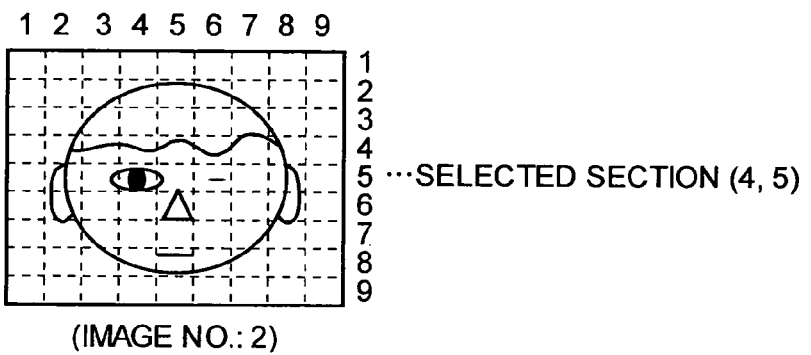
Figure 4C:
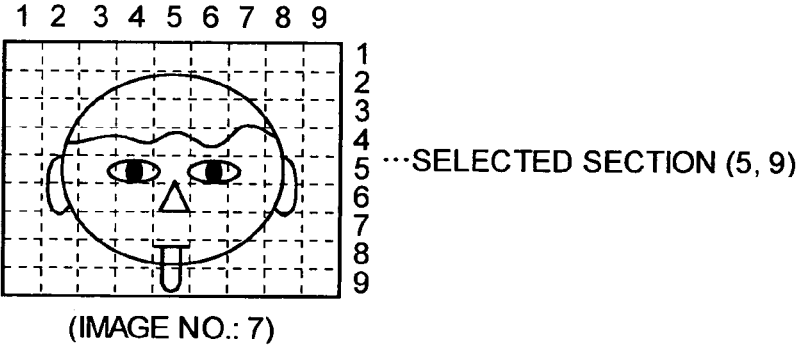
Figure 4D:
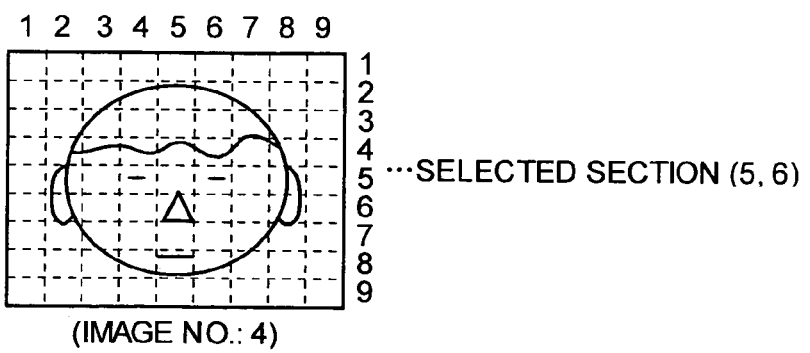

Moreover, it is supposed that the user has chosen a rectangle area (2, 6) that corresponds to the right ear (refer to FIG. 4A) for the image of the image number "12", and a rectangle area (4, 5) that corresponds to the right eye (refer to FIG. 4B) for the image of the image number "2", a rectangle area (5, 9) that corresponds to the tongue put out of the mouth (refer to FIG. 4C for the image of the image number "7", and a rectangle area (5, 6) that corresponds to the nose (refer to FIG. 4D) for the image of the image number "4".

If such the registration process of the password is carried out by the user of the user number "0001", "(12, 2,→6)(2, 4, 5)→(7, 5, 9)→(4, 5, 6)" are stored in the password DB 14b as the password that corresponds to the user number "0001".

Thus, the password for each of the user is stored in the password DB 14b, and the standard images are at the option of the user to choose among the plurality of the images stored in the image DB 14a. Therefore, the standard images displayed in the touch panel unit 12 are different depending on each of the users.

Referring to FIG. 1 again, the control device 15 includes an internal memory to store a control program such as an OS (Operating System), and a computer program and necessary data that specify various kinds of process procedures. The control device 15 is a processing unit to execute such the various kinds of the processes, and includes an image display controlling unit 15a, a password input controlling unit 15b, and a password verifying unit 15c as conceptual functions.

The image display controlling unit 15a is a processing unit that controls to display, in the touch panel unit 12, the standard image, which has been chosen by the user as the images for the password input, and the dummy image, which is made to look like the standard image. The standard image is, among the plurality of the images stored in the image DB 14a, the image that corresponds to the image number included in the password stored in the password DB 14b, while the dummy image is the image that does not correspond to the image number included in the password stored in the password DB 14b.

This is explained with a concrete example. As shown in FIG. 3, for the user of the user number "0001", each of the images that have the image numbers of "12, 2, 7, and 4" is the standard image, and each of the other images, namely, each of the images that have the image numbers of "1, 3, 5, 6, 8, 9, 10, and 11" is the dummy image. Similarly, for a user of the user number "0002", each of the images that have the image numbers of "1, 11, 6, and 8" is the standard image, and each of the other images, namely, each of the images that have the image numbers of "2, 3, 4, 5, 7, 9, 10, and 12" is the dummy image.

In other words, each of the images that can be displayed in the touch panel unit 12 cannot be classified into the standard image and the dummy image based on the type of the images, but can be the standard image for some of the users and can be the dummy image for the other subject users. Therefore, it becomes even more difficult for the third party to grasp whether the image displayed in the touch panel unit 12 is the standard image or the dummy image (the images other than the standard image).

Furthermore, the image display controlling unit 15a controls to display the standard image and the dummy image independently in a random order when the standard image and the dummy image described above are to be displayed in the touch panel unit 12. In other words, the image display controlling unit 15a randomly makes a selection on which of the standard image or the dummy image to be displayed every time an image is to be displayed in the touch panel unit 12, and controls to display either of the standard image and the dummy image depending on the selection made:

This is explained with a concrete example. For the user of the user number "0001", the image displayed first is not always the standard image of the image number "12". The standard image may be displayed as the second image or the third image. Furthermore, the dummy image may be displayed in a row from the second image to the fifth image. In other words, each of the images displayed in the touch panel unit 12 cannot be classified into the standard image and the dummy image based on the display order.

Because the standard images and the dummy images are not always displayed in the same order in touch panel unit 12, even the same user has to carry out different input operations at each of the password verification. Therefore, even if the third party carries out exactly the same input operation as the input operation by the user that the third party sees, it is difficult to input the proper password.

Moreover, when the dummy image described above is to be displayed, the image display controlling unit 15a controls to display the image that is randomly selected from among the plurality of the images that can be displayed as the dummy image. In other words, if the dummy image is selected to be displayed as a result of the random selection on which of the standard image or the dummy image is to be displayed, the image display controlling unit 15a controls to display, in the touch panel unit 12, one of the images that is randomly selected from among the plurality of the images that can be the dummy image for the user.

This is explained with a concrete example. For the user of the user number "0001", each of the dummy images are the images that have the image numbers of "1, 3, 5, 6, 8, 9, 10, and 11" among the images stored in the image DB 14a. Every time the selection to display the dummy image is made, one of the images is randomly chosen from among the image numbers "1, 3, 5, 6, 8, 9, 10, and 11".

Thus, even during one password verification, the dummy image displayed in the touch panel unit 12 is not always the same image, but always the different image every time the dummy image is displayed. Therefore, even if the third party carries out exactly the same input operation as the input operation by the user that the third party sees, it is difficult to input the proper password.

If the standard image is selected to be displayed as a result of the random selection on which of the standard image or the dummy image is to be displayed, the image display controlling unit 15a controls to display, in the touch panel unit 12, the standard image according to the order of the password stored in the password DB 14b. In other words, for the user of the user number "0001", when the first selection to display the standard image is made, the standard image of the image number "12" is displayed, and when the second selection to display the standard image is made the standard image of the image number "2" is displayed.

To explain the control device 15 again, the password input controlling unit 15b is a processing unit that controls to input the designated information for the standard image as the password for the verification, and not to input the designate information for the dummy image as the password for the verification. In other words, regarding the designation to a predetermined rectangle area in the standard image, the information (the designated information) that indicates the predetermined rectangle area is input as the password for the verification, while, regarding the designation to a predetermined rectangle area in the dummy image, the information (the designated information) that indicates the predetermined rectangle area is not input as the password for the verification.

This is explained with a concrete example. For the user of the user number "0001", the designated information in each of the standard images of the image numbers of "12, 2, 7, and 4" is input as the password, but the designated information in each of the dummy images of the image number of "1, 3, 5, 6, 8, 9, and 10, and 11" is not input as the password.

Therefore, the user of the user number "0001" touches each of the rectangle areas that correspond to the designated information of "(2, 6), (4, 5), (5, 9), and (5, 6)" when each of the standard images of the image numbers of "12, 2, 7, and 4" is displayed in the touch panel unit 12, while the user randomly touches as he/she likes when each of the dummy images of the image numbers of "1, 3, 5, 6, 8, 9, and 10, and 11" is displayed. The user of the user number "0001" inputs the proper password (the password that leads to successful result in the verification) by such the input operation.

Furthermore, the password input controlling unit 15b only inputs, as the password, the designated information for the standard image that is input within a predetermined time sufficiently provided to the user to be able to touch a predetermined rectangle area. If the designated information is not input within the predetermined time (the user fails to touch the touch panel unit 12), the password input controlling unit 15b controls to display a different one of the standard images or the dummy images in the touch panel unit 12.

To explain the control device 15 again, the password verifying unit 15c is a processing unit that verifies whether the password for the verification that is input from the password input controlling unit 15b corresponds with the password stored in the password DB 14b, and that outputs a verification result to the cash processing unit 16.

This is explained with a concrete example. If the user of the user number "0001" touches each of the rectangle areas that correspond to the designated information of "(2, 6), (4, 5), (5, 9), and (5, 6)" for each of the standard images of the image numbers of "12, 2, 7, and 4", the password "(12, 2, 6)→(2, 4, 5)→(7, 5, 9)→(4, 5, 6)" for the verification is input by the password input controlling unit 15b, and the verification result of "succeeded" is output to the cash processing unit 16.

On the other hand, if the user fails to touch each of the rectangle areas that correspond to the designated information above for each of the standard images of the image numbers of "12, 2, 7, and 4", the password that is different from the password for the verification shown above is input by the password input controlling unit 15b, and the verification result of "failed" is output to the cash processing unit 16.

A procedure of a password inputting process by the password inputting apparatus 10 according to the first embodiment of the present invention is explained next. FIG. 5 is a flowchart for explaining the procedure of the password inputting process by the password inputting apparatus 10 according to the first embodiment. As shown in the figure, in the password inputting apparatus 10, when a user number is input by inserting a card into the card processing unit 11(step S501, Yes), the image display controlling unit 15a randomly selects which one of the standard image or the dummy image to display in the touch panel unit 12 (step S502).

If the standard image is selected to be displayed in this selection (step S502, Yes), the image display controlling unit 15a controls to display, in the touch panel unit 12, the standard image according to the order of the password stored in the password DB 14b (step S503). The standard image, for example, for the user of the user number "0001" is the standard image of the image number "12" for the first selection to display the standard image, and the standard image of the image number "2" for the second selection to display the standard image.

Then, when the designated information for the standard image, which is displayed in the touch panel unit 12, is input by the user within the predetermined time (step S504, Yes), the password input controlling unit 15b inputs the designated information as the password (step S505). If the designated information fails to be input by the user within the predetermined time (step S504, No), the step S502 described above is repeated, and the image display controlling unit 15a randomly selects which one of the standard image or the dummy image to display in the touch panel unit 12 (step S502).

If the designated information is input as the password for the verification in the step S505 described above, it is determined whether all the standard images for the user have been displayed based on the standard images being displayed at this input (step S506). If all the standard images have been displayed for the user (step S506, Yes), the password verifying unit 15c determines whether the password input by the password input controlling unit 15b corresponds with the password stored in the password DB 14b, and outputs the verification results to the cash processing unit 16 (steps S507 and S508).

On the other hand, if all the standard images have not been displayed for the user (step S506, No), the step S502 described above is repeated, and the image display controlling unit 15a randomly selects which one of the standard image or the dummy image to display in the touch panel unit 12 (step S502).

In the step S502 described above, if the dummy image is selected to be displayed instead of the standard image (step S502, No), the image display controlling unit 15a randomly selects one image from among the plurality of the images that can be the dummy image for the user, and controls to display, in the touch panel unit 12, the dummy image selected (step S509).

Then, if the designated information for the dummy image, which is displayed in the touch panel unit 12, is input by the user within the predetermined time (step S510, Yes), the password input controlling unit 15b does not input the designated information as the password for the verification (step S511). Thus, the step S502 described above is repeated, and the image display controlling unit 15a randomly selects which one of the standard image or the dummy image to display in the touch panel unit 12 (step S502).

Moreover, also if the designated information for the dummy image, which is displayed in the touch panel unit 12, fails to be input by the user within the predetermined time (step S510, No), the step S502 described above is repeated, and the image display controlling unit 15a randomly selects which one of the standard image or the dummy image to display in the touch panel unit 12 (step S502).

By a series of the process described above, the user touches the rectangle area that corresponds to the designated information when the standard image is displayed in the touch panel unit 12, while the user randomly touches a rectangle area as he/she likes when the dummy image is displayed. By this input operation, the user inputs the proper password (the password that leads to successful result in the verification).

The processes carried out by the image display controlling unit 15a (steps S502, S503, and S509) in the series of the processes above are concretely explained with reference to the images to be displayed in the touch panel unit 12. FIGS. 6A to 6H are diagrams for explaining the image that is displayed in the touch panel unit 12. For example, if the user number "0001" is input, and if the standard image is selected to be displayed, the image display controlling unit 15a displays the standard image of the image number "12" in the touch panel unit 12 as a first display image (refer to FIG. 6A).

Then, if the dummy image is selected to be displayed, and the image number "1" is randomly selected as the dummy image, the dummy image of the image number "1" is displayed in the touch panel unit 12 as a second display image (refer to FIG. 6B). If the dummy image is selected again to be displayed, and the image number "5" is randomly selected as the dummy image, the dummy image of the image number "5" is displayed in the touch panel unit 12 as a third display image (refer to FIG. 6C).

Then, if the standard image is selected to be displayed, the image display controlling unit 15a displays the standard image of the image number "2" in the touch panel unit 12 as a fourth display image (refer to FIG. 6D). Further, if the standard image is selected to be displayed in a row, the image display controlling unit 15a displays the standard image of the image number "7" in the touch panel unit 12 as a fifth display image (refer to FIG. 6E).

If the dummy image is selected to be displayed next, and the image number "9" is randomly selected as the dummy image, the dummy image of the image number "9" is displayed in the touch panel unit 12 as a sixth display image (refer to FIG. 6F). If the dummy image is selected to be displayed again in a row, and the image number "8" is randomly selected as the dummy image, the dummy image of the image number "8" is displayed in the touch panel unit 12 as a seventh display image (refer to FIG. 6G).

If the standard image is selected to be displayed next, the standard image of the image number "4" in the touch panel unit 12 as an eighth display image (refer to FIG. 6H). Then, because all the standard images have been displayed for the user of the user number "0001", the password verifying unit 15c verifies the password for the verification, which is the designated information for each of the standard images (the fist display image, the fourth display image, the fifth display image, and the eighth display image), input by the password input controlling unit 15b.

As described above, according to the first embodiment, the standard images that are chosen in advance by the user as the images for the password input, and the dummy images that are made to look like the standard images are both displayed for the user, and only the designated information for the standard images is input as the password for the verification, and the designated information for the dummy images is not input as the password for the verification. Therefore, it is possible to prevent the password from being guessed by the third party even if the password input is seen by the third party.

The password inputting apparatus 10 that is explained in the first embodiment above is realized by executing a computer program that is prepared in advance in a computer system such as a personal computer and a workstation. In a second embodiment, the computer system to execute a computer program for inputting the password that has the same function as the password inputting apparatus 10 explained in the first embodiment above is explained.

Figure 7:
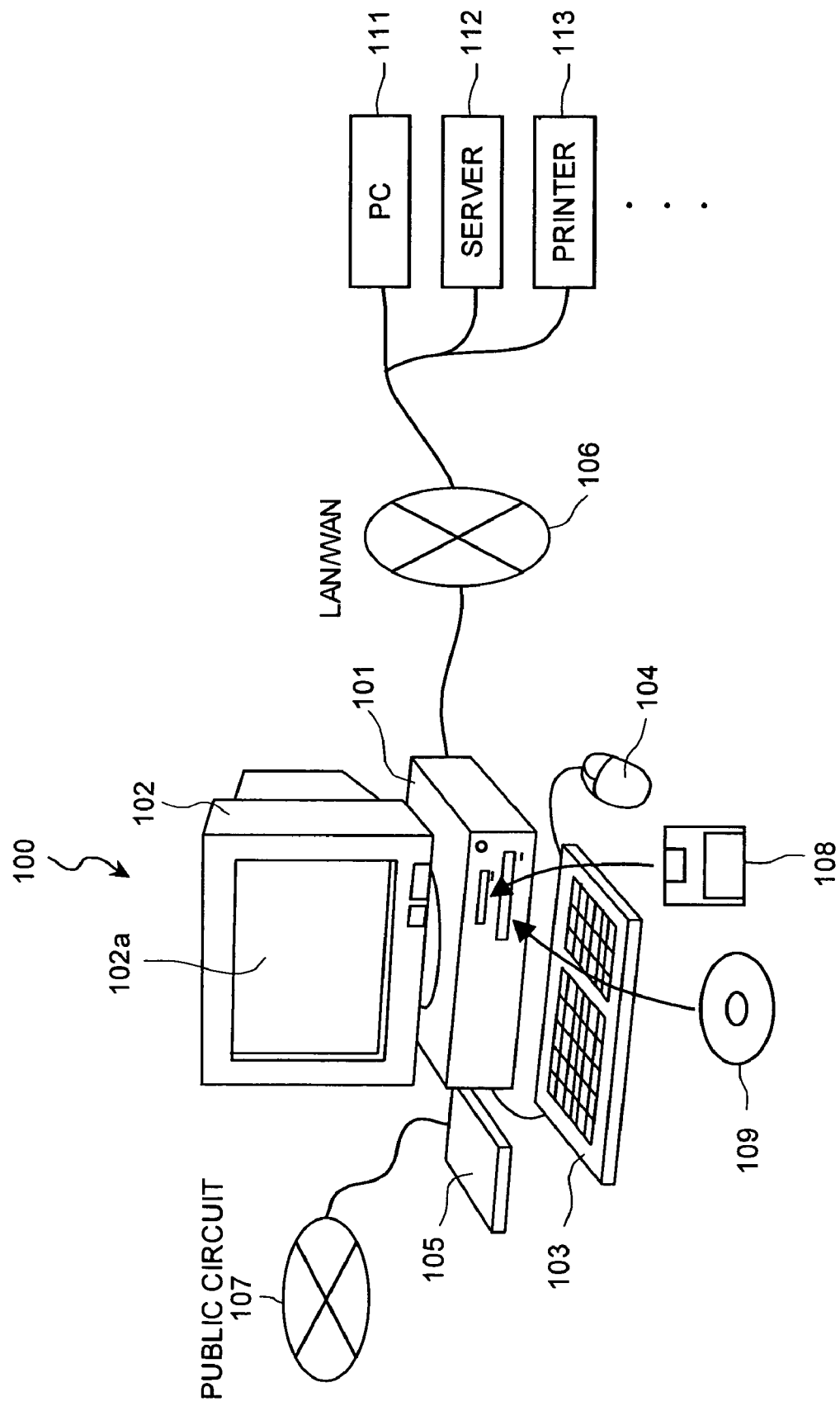
FIG. 7 is a diagram that illustrates a configuration of a computer system according to a second embodiment of the present invention.
Figure 8:
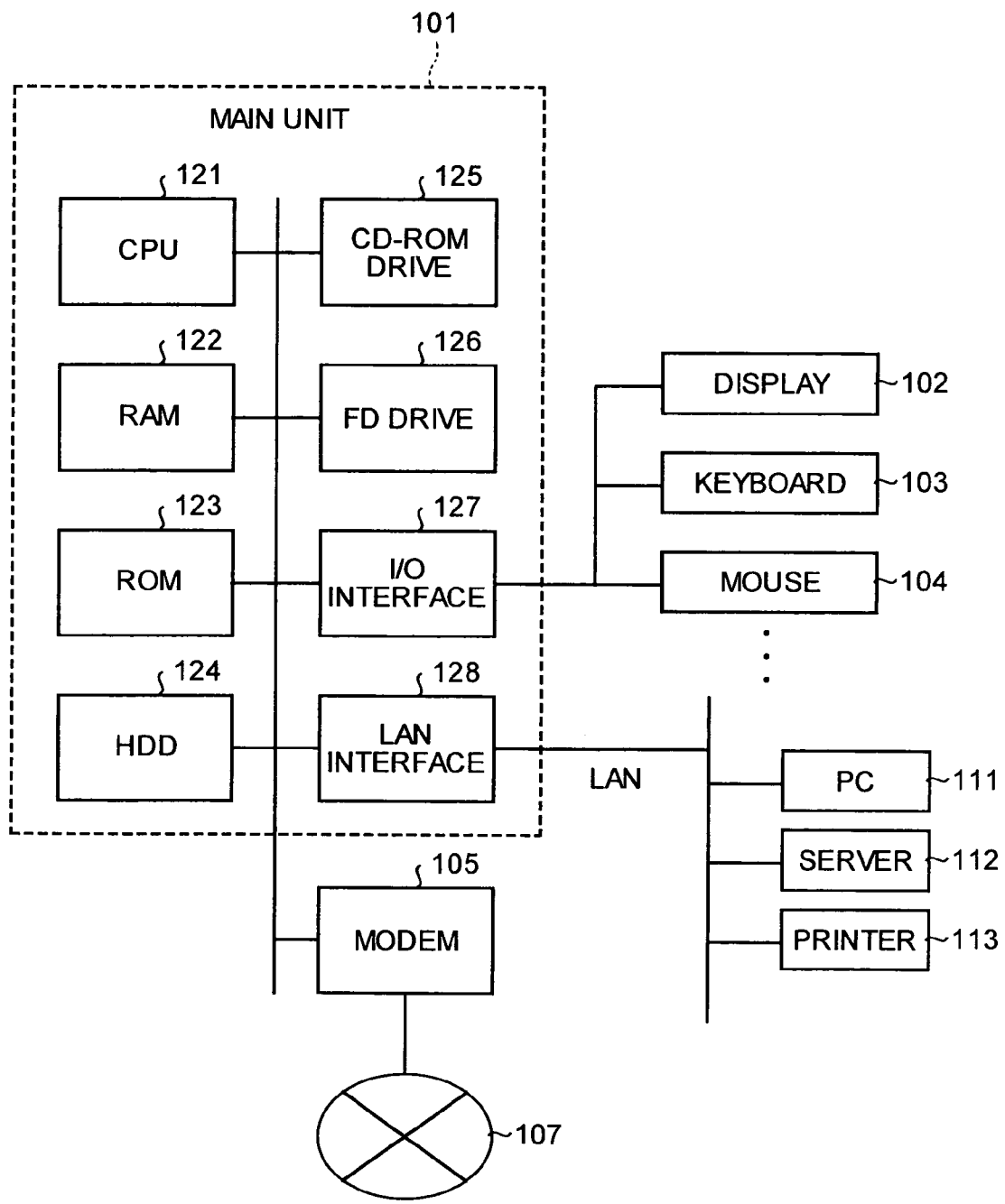
FIG. 8 is a block diagram that explains a configuration of a main unit in the computer system.

FIG. 7 is a computer system 100 according to the second embodiment, and FIG. 8 is a block diagram of a main unit in the computer system 100. The computer system 100 includes a main unit 101, a display unit 102 to display information such as an image displayed in a display 102a in accordance with a direction from the main unit 101, a keyboard 103 for inputting various kinds of information into the computer system 100, and a mouse 104 to point a desirable position on the display 102a in the display unit 102.

Furthermore, the main unit 101 of the computer system 100 includes a CPU 121, a RAM 122, a ROM 123, a hard disk drive (HDD) 124, a CD-ROM drive 125 that accepts a CD-ROM 109, a FD drive 126 that accepts a flexible disk (FD) 108, an I/O interface 127 that connects the display unit 102, the keyboard 103, and the mouse 104, and a LAN interface 128 to connect to a Local Area Network or a Wide Area Network (LAN/WAN) 106.

Moreover, a modem 105 to connect to a public circuit 107 such as the Internet is connected to the computer system 100. Another computer system (PC) 111, a server 112 and a printer 113 and the like are also connected to the computer system 100 through the LAN interface 128 and the LAN/WAN 106.

The computer system 100 realizes the password inputting apparatus 10 (the method of inputting the password) by reading and executing a computer program for the password input that is stored in a predetermined storage medium.

The predetermined storage medium includes a "transportable physical medium" such as the flexible disk (FD) 108, the CD-ROM 109, an MO disk, a DVD disk, a Magneto-Optical disk, and an IC card, and a "fixed physical medium" such as the hard disk drive (HDD) 124, the RAM 122, and the ROM 123, that are installed inside or outside the computer system 100, and a "communication medium", which retains the computer program for a short period at a transmission of the computer program, such as the public circuit 107 that is connected through the modem 105, and the LAN/WAN 106 to which the other computer system 111 and the server 112 are connected. The predetermined storage medium includes various kinds of the storage medium that can store the computer program for the password input that is readable by the computer system 100.

In other words, the computer program for inputting the password is stored readably by a computer in the storage device such as the "transportable physical medium", the "fixed physical medium", and the "communication medium" described above. The computer system 100 realizes the password inputting apparatus (or the method of inputting the password) by reading, from such the storage medium, and executing the computer program for inputting the password. The computer program for inputting the password is not to be limited to be executed by the computer system 100. The present invention may be applied to a case in which the other computer system 111 or the server 112 executes the computer program for inputting the password, or to a case in which both of these execute the computer program for the password input together.

While a case of applying the present invention to the ATM (automatic teller machine) has been explained above, the present invention is not to be limited to this case. The resent invention can be applied to various kinds of information devices, such as a personal computer that require a user to input a password for the purpose of password verification.

Moreover, while a case in which the image numbers that correspond to the images chosen in advance by the user as the standard images (the image for the password input) are stored in the password DB 14b, the present invention is not to be limited to this case, and the image numbers that correspond to the dummy images that are chosen in advance by the user from among the plurality of the images, which are stored in the image DB 14a, may also be stored together with the image numbers of the standard images.

By storing the image numbers of the dummy images also, when the dummy image is to be displayed in the touch panel unit 12, the dummy image is the image that is randomly selected from among one or more of the dummy images that are chosen by the user himself/herself in advance as the dummy images. Therefore, for the user, it is easy to tell the image displayed is whether the standard image or the dummy image, and it becomes possible to reduce erroneous input of the password by the user.

Furthermore, while a case in which the standard image and the dummy image are controlled to be displayed each independently in a random order has been explained above, the present invention is not to be limited to this case, and is also applicable in the same way to a case in which the standard image and the dummy image are controlled to be displayed at one time in a random arrangement.

In other words, the images shown in FIG. 6 are displayed at one time in the touch panel unit 12 in the random arrangement. Therefore, the user can carry out the password input speedily, and it becomes possible to prevent the password from being guessed by the third party further effectively. In this case, the order in which the password is input does not matter (in other words, the password stored in the password DB 14b may not matter the order of the standard images).

Moreover, while a case in which the image to be displayed in the touch panel unit 12 is the image that can be the standard image for some users, and can also be the dummy image for other users has been explained, the present invention is not to be limited to this case, and is applicable in the same way to a case in which the standard images and the dummy images that are all different depending on the user are displayed. In other words, regardless of relationship with other users, the present invention is applicable to any case as long as the standard image chosen in advance by the user as the image for the password input, and the dummy image made to look like the standard image are displayed.

Furthermore, a case in which the images that include the same components, and that are recognized as the same concept are displayed as the standard image and the dummy image has been explained, the present invention is not to be limited to this case, and is applicable in the same way to a case in which images that include different components, and that are recognized as each different concepts are displayed.

Moreover, a case in which the information that indicates the predetermined rectangle area is input according to the designation for the predetermined rectangle area in the standard image has been explained, the present invention is not to be limited to this case, and is applicable in the same way also to a case in which information that indicates a predetermined component is input according to designation made to the predetermined component (for example, "ear" and the like in FIG. 9) as long as the designation is made for the predetermined part in the standard image.

Furthermore, a case of the touch panel unit 12 to which the user touches the touch panel unit 12 to input the designated information has been explained, the present invention is not to be limited to this case, and is also applicable in the same way to a case of various conditions including a case of a pointing unit such as a mouse with which the designated information is indirectly input.

Moreover, a case of four of the standard images for which one each of the designated information is input, the present invention is not to be limited to this case, and is also applicable in the same way to a case of one of the standard image for which more than one of the designated information is input, or a case of more than at least one of the standard image for which more than at least one of the designated information is input. The password that is stored in the password DB 14b also varies depending on a number of the standard images and the designated information.

Furthermore, among the processes explained above, all or a part of the processes that has been explained as the process carried out automatically may also be carried out manually, and all or a part of the processes that has been explained as the processes carried out manually may also be carried out automatically by a common method. Besides, the process procedure, the control procedure, specific names, and the information that includes various data and parameters may be modified arbitrarily except for a case specifically mentioned.

Moreover, each of the components of the password inputting apparatus 10 shown in the drawings is a conceptual function, and is not necessarily structured physically as shown in the drawings. In other words, a specific pattern of decentralization and integration of the password inputting apparatus 10 is not to be limited to the pattern shown in the drawings, and all or a part of the password inputting apparatus 10 may be structured by decentralizing or integrating functionally or physically in arbitrary units. For example, the storage device 14 is not necessarily included in the password inputting apparatus 10, and may be managed on another computer device, and send or receive necessary data as required by the control device 15 through a network.

As described, according to the present invention, because it is impossible for a third party to decide whether a display image is a standard image or a dummy image, it becomes difficult for the third party to memorize all sections designated by the user. Therefore, it is possible to prevent a password from being guessed by the third party even if the password input is seen by the third party.

Furthermore, it becomes more difficult for the third party to grasp whether the display image is the standard image or the dummy image. Therefore, it is possible to prevent the password from being guessed by the third party securely even if the password input is seen by the third party.

Moreover, because it is easy for the user to recognize whether the display image is the standard image or the dummy image, it becomes possible to reduce an erroneous input of the password by the user, while it becomes more difficult for the third party to grasp whether the display image is the standard image or the dummy image. Therefore, it is possible to reduce the erroneous input of the password by the user, and to prevent the password from being guessed by the third party securely even if the password input is seen by the third party.

Furthermore, it is difficult to input a proper password even if the third party repeated the password input, which the third party has seen, exactly the same way as the user has input. Therefore, it is possible to prevent the password from being guessed by the third party securely even if the password input is seen by the third party.

Moreover, the user can input the password speedily, therefore, it becomes possible to further prevent the password from being guessed by the third party, while it becomes more difficult for the third party to input the proper password even if the third party repeated the password input, which the third party has seen, exactly the same way as the user has input. Therefore, it is possible to prevent the password from being guessed by the third party securely even if the password input is seen by the third party.

Furthermore, it certainly becomes difficult to input the proper password even if the third party repeated the password input, which the third party has seen, exactly the same way as the user has input. Therefore, it is possible to prevent the password from being guessed by the third party securely even if the password input is seen by the third party.

Moreover, it is difficult for the third party, who sees the password input, to memorize the password input carried out for a plurality of similar images by the user. Therefore, it is possible to prevent the password from being guessed by the third party securely even if the password input is seen by the third party.

Furthermore, because same designated information is input regardless of a part pointed as long as within a predetermine rectangle area, the password input becomes easy for the user to carry out. Therefore, it is possible to make the password input easy for the user, and to prevent the password from being guessed by the third party securely even if the password input is seen by the third party.

Moreover, because same designated information is input regardless of an area designated as long as a predetermined component is designated, the password input becomes easy for the user to carry out. Therefore, it is possible to make the password input easy for the user, and to prevent the password from being guessed by the third party even if the password input is seen by the third party.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The invention claimed is:

1. A transportable physical medium that contains a computer program, the program which when executed by a computer causes the computer to execute the process comprising:
    displaying a standard image that includes a first section previously chosen by the user as a section for password input;
    displaying at least one dummy image;
    receiving a third section in the standard image selected by the user;
    receiving a second section in the dummy image selected by the user;
    generating a password based on information corresponding to the third section and not generating a password based on information corresponding to the second section; and
    verifying the third section in the standard image is equal to the first section in the standard image.

2. The transportable physical medium according to claim 1, wherein the standard image for one user can be the dummy image for other users, the dummy image-for one user can be the standard image for other users, and
    the displaying a standard image includes displaying as the standard image an image that has been previously chosen by the user as the standard image; and
    the displaying at least one dummy image includes displaying as the dummy image an image that is not chosen by the user as the standard image.

3. The transportable physical medium according to claim 1, wherein the standard image for one user can be the dummy image for other users, the dummy image for one user can be the standard image for other users, and
    the displaying a standard image includes displaying as the standard image an image that has been previously chosen by the user as the standard image; and
    the displaying at least one dummy image includes displaying as the dummy image an image that has been previously chosen by the user as the dummy image.

4. The transportable physical medium according to claim 1, wherein the displaying a standard image and the displaying at least one dummy image are performed one after the other in a random order.

5. The transportable physical medium according to claim 1, wherein the displaying a standard image and the displaying at least one dummy image are performed simultaneously.

6. The transportable physical medium according to claim 1, wherein a plurality of the dummy images are prepared, and
    the displaying at least one dummy image includes displaying an image that is randomly selected from among the dummy images.

7. The transportable physical medium according to claim 1, wherein the displaying a standard image and the displaying at least one dummy image include displaying the standard image and displaying the dummy image that include same components, and that are recognized as a same concept as the standard image and the dummy image.

8. The transportable physical medium according to claim 1, further causing the computer execute dividing the standard image into a plurality of areas, and
    the first section is an area from among the areas.

9. The transportable physical medium according to claim 1, further causing the computer to execute dividing the standard image into a plurality of components, and the first section is a component from among the components.

10. A password inputting apparatus comprising:

a displaying unit that displays a standard image that includes a first section previously chosen by the user as a section for password input, and displays at least one dummy image;

a receiving unit that receives a third section in the standard image selected by the user, and a second section in the dummy image selected by the user;

a password generating unit that generates a password based on information corresponding to the a third section and does not generate a password based on information corresponding to the second section; and a password verifying unit that verifies the third section in the standard image is equal to the first section in the standard image.

11. The password inputting apparatus according to claim 10, further comprising:

a first storing unit that stores a plurality of images;

a second storing unit that stores information, for each user, about an image that has been previously chosen by the user as the standard image from among the images stored in the first storing unit; and a third storing unit that stores information, for each user, about an image that is not chosen by the user as the dummy image from among the images stored in the first storing unit, wherein the displaying unit displays, for each user, the standard image based on the information stored in the second storing unit and, displays, for each user, the dummy image based on the information stored in the third storing unit.

12. The password inputting apparatus according to claim 10, further comprising:

a first storing unit that stores a plurality of images;

a second storing unit that stores information, for each user, about an image that has been previously chosen by the user as the standard image from among the images stored in the first storing unit; and a third storing unit that stores information, for each user, about an image that has been previously chosen by the user as the dummy image from among the images stored in the first storing unit, wherein the displaying unit displays, for each user, the standard image based on the information stored in the second storing unit and, displays, for each user, the dummy image based on the information stored in the third storing unit.

13. A method of inputting a password, comprising:

displaying a standard image that includes a first section previously chosen by the user as a section for password input;

displaying at least one dummy image;

receiving a third section in the standard image selected by the user;

receiving a second section in the dummy image selected by the user;

generating a password based on information corresponding to the third section and not generating a password based on information corresponding to the second section; and verifying the third section in the standard image is equal to the first section in the standard image.

* * * * *